United States Patent
Varone et al.

(10) Patent No.: US 8,499,180 B2
(45) Date of Patent: Jul. 30, 2013

(54) IC CARD WITH LOW PRECISION CLOCK

(75) Inventors: Francesco Varone, Bellona (IT); Pasquale Vastano, S. Maria Capua Vetere (IT); Amedeo Veneroso, Caserta (IT)

(73) Assignee: STMicroelectronics International N.V., Geneva (CH)

( * ) Notice: Subject to any disclaimer, the term of this patent is extended or adjusted under 35 U.S.C. 154(b) by 715 days.

(21) Appl. No.: 12/122,359

(22) Filed: May 16, 2008

(65) Prior Publication Data

US 2008/0294930 A1 Nov. 27, 2008

(30) Foreign Application Priority Data

May 17, 2007 (IT) .................... MI07A0997

(51) Int. Cl.
*G06F 1/00* (2006.01)
(52) U.S. Cl.
USPC ............................ 713/322; 713/500; 713/600
(58) Field of Classification Search
USPC ......................................... 713/322, 500, 600
See application file for complete search history.

(56) References Cited

U.S. PATENT DOCUMENTS

| | | | | |
|---|---|---|---|---|
| 4,827,111 A * | 5/1989 | Kondo | ........................... | 235/380 |
| 5,247,164 A * | 9/1993 | Takahashi | ..................... | 235/492 |
| 5,737,588 A * | 4/1998 | Maeda et al. | .................. | 713/500 |
| 5,844,435 A * | 12/1998 | Grundvig | ..................... | 327/151 |
| 6,216,233 B1 * | 4/2001 | Baweja | .......................... | 713/322 |
| 6,728,234 B1 * | 4/2004 | Hofmann et al. | ............. | 370/350 |
| 6,845,454 B2 * | 1/2005 | Kim | ............................... | 713/300 |
| 6,976,182 B1 * | 12/2005 | Filippo | ......................... | 713/324 |
| 7,017,810 B2 * | 3/2006 | Bando | .......................... | 235/441 |
| 7,296,170 B1 * | 11/2007 | Richmond et al. | ............ | 713/324 |
| 7,401,236 B2 * | 7/2008 | Adachi | ......................... | 713/300 |
| 7,493,510 B2 * | 2/2009 | Sung et al. | ..................... | 713/503 |
| 7,535,287 B2 * | 5/2009 | May et al. | ..................... | 327/544 |
| 7,657,687 B2 * | 2/2010 | Ootsuka et al. | ................ | 710/305 |
| 7,685,328 B2 * | 3/2010 | Fruhauf et al. | .................. | 710/11 |
| 2002/0062457 A1 * | 5/2002 | Kamihara | ..................... | 713/600 |
| 2002/0095494 A1 * | 7/2002 | Fujita et al. | ..................... | 709/224 |
| 2003/0014620 A1 * | 1/2003 | Hanjani | ............................. | 713/1 |
| 2003/0079152 A1 * | 4/2003 | Triece | .......................... | 713/322 |
| 2004/0168098 A1 * | 8/2004 | Matsuoka et al. | ........... | 713/600 |
| 2007/0038876 A1 * | 2/2007 | Berthold et al. | ............. | 713/300 |
| 2008/0005561 A1 * | 1/2008 | Brown et al. | ................. | 713/164 |
| 2008/0104448 A1 * | 5/2008 | Tamura | ........................... | 714/40 |
| 2008/0231328 A1 * | 9/2008 | Leydier et al. | ................ | 327/105 |
| 2008/0288798 A1 * | 11/2008 | Cooper et al. | ................ | 713/322 |

FOREIGN PATENT DOCUMENTS

EP 1480174 5/2003

* cited by examiner

*Primary Examiner* — Kim Huynh
*Assistant Examiner* — Zahid Choudhury
(74) *Attorney, Agent, or Firm* — Allen, Dyer, Doppelt, Milbrath & Gilchrist, P.A.

(57) ABSTRACT

An IC Card may include electronic components to receive a power supply and a main clock signal by a reader device. The power supply may be provided to a subset of the electronic components during a main clock stop status wherein the main clock signal is suspended for avoiding a maximum power consumption threshold. The IC Card may also include a low precision clock included in the subset of electronic components for measuring time in the main clock stop status.

16 Claims, 3 Drawing Sheets

IC CARD WITH LOW PRECISION CLOCK

FIELD OF THE INVENTION

The present invention relates to IC Cards, and, more particularly, to IC Card clocks.

BACKGROUND OF THE INVENTION

As it is well known, an IC Card is an electronic device intended to communicate with a reader device via a standard communication channel, generally comprising a contact pad of the IC Card. As schematically represented in FIG. 1, the IC Card comprises electronic components, for example, a CPU and one or more memory portions for storing data, and the IC Card is generally powered by the reader device, for example, through a contact between the contact pad of the IC Card and a respective contact pad on the reader device. More particularly, the reader device is responsible not only to power the CPU and the memory portions of the IC Card, but also to provide a clock signal to the IC Card for the synchronization of the electronic components of the IC Card.

The reader device includes a clock for generating, by an oscillator, a stationary and regular train of clock signals for the electronic components of the IC Card, for example, for synchronizing its instruction decoder, ALU, memory bus, etc.

To measure time, the IC Card generally comprises a timer, including a counter that is incremented at each clock signal received by the reader device. The IC Card also generally stores a threshold value to be compared with the counter. When the counter reaches the threshold value, the timer is aware that specific times have elapsed and sends an interrupt to the other electronic components of the IC Card. For example, a program executing inside the IC Card may be notified by the timer when a specific time is elapsed.

When the reader device is a portable device, for example, a mobile telephone with limited power supply autonomy, some measures are introduced to limit the power consumption, for example, by limiting the power supply to the IC Card when no operations are ongoing between the IC Card and the reader device.

FIG. 2 schematically represents a mobile telephone 2 intended to communicate with an IC card 1 via a reader/device IC Card interface. For example, the measures for limiting the power consumption of the reader device may be intended to suspend the clock signal, and at the same time, maintaining a power supply to other electronic components of the IC Card, for example, to the memory portions, in order to maintain available IC Card data stored therein.

More particularly, in order to save energy, the IC Card may suspend the power supply to one or more components in response to power saving mode entering requested by the reader device, for example, electronic components used for counting time, like the timer or the CPU.

For clarity, in the following description a status in which the IC Card is not able to count time is indicated with the term "clock stop". Due to a clock stop, the IC Card is not aware of the time. In fact, when a provision of a clock signal is restored by the reader device after a clock stop, the timer of the IC Card may restart to count time, but it is not aware of the time past due to the clock stop. In other words, it is not aware of the time past during the suspension of the clock signal.

An IC Card not aware of time is exposed to potential attacks. For example, an IC Card security policy or algorithm may provide that, after an unsuccessful cryptographic operation with a cryptographic key, such an operation cannot be performed again before a specific time has occurred. In this case, a hacker may emulate a clock stop in order to execute attacks without being blocked, including several executions of cryptographic operations with a range of cryptographic keys.

IC Card standards generally require that the IC Card is in a clock stop status between two consecutive application protocol data units (APDU), as illustrated in FIG. 3. An APDU is a data exchange between the IC Card and the reader device.

When the reader device requests that the IC Card enter a clock stop status, it is impossible for the IC Card to measure the time over such multiple APDUs.

Known IC Cards attempt to measure time over multiple APDUs based on a timer service provided by a host device external to the IC Card. Such IC Cards try to replace the timer calculated internally to the IC Card when the IC Card is not able to process such a timer, due to the absence of a clock signal.

More particularly, such IC Cards provide the timer by executing the following steps: the IC Card sends a timer request for a time "n" to the host device; the host device allocates a time "n" and starts the timer service; the host device turns the clock signal off; the IC Card enters the clock stop status; and after time "n" has elapsed, the host device re-enables the clock signal for the IC Card and sends it a notification. As a result, the IC Card is aware that time "n" is passed.

However, such IC Cards are limited by several drawbacks since the timer service is not guaranteed to be secure. For example, because the host device is busy on a radio interface or on a user operation execution, it does not notify the IC Card as soon as the device timer is expired but only when it has served the radio interface or the user operation.

Moreover, the host device may not be a trusted entity with respect to the IC Card, and it is not guaranteed to be a trusted notification of the time, for example, because the host device is hacked, or the IC Card is inserted in a reader device programmed to emulate a response of the host device with accelerated scale time. Furthermore, even if the host device is trusted, for example, through a ciphered protocol for the communication with the IC Card, such trusted host device could not be available due to lack of a connection with the reader device that powers the IC Card.

Some IC Cards may measure time based on an internal clock, as illustrated in FIG. 1. The internal clock signal is generated inside the IC Card when in the clock stop status, or in other words, when the reader device suspends the clock signal.

Such an internal clock is not programmed based on a maximum power consumption admitted during the clock stop status, and it cannot provide the internal clock signal all the time in which the clock status occurs. The aim of such an internal clock, in fact, is not to be available when the external clock is stopped, but to provide a frequency clock much higher than the external one, also, when not in clock stop, to speed-up all the IC Card operations.

Other IC Cards, known in the GSM/UMTS standard, provides a timer based on the reader device informing the IC Card of the elapsed time by using a TIMER MANAGEMENT proactive command. However, these IC Cards do not provide an approach to the problem underlined above, since a reader device could not be considered a trusted device, and also because a clock signal request from the IC Card to the reader device may fail, for example, because the reader device is busy to perform other operations.

European patent application EP1480174 in the name of Axalto discloses how to securely request a time server current time stamp. The application fails to overcome the problem cited above since a time server is not always available, for example, if a current network coverage is not available, generating long delays in case of unsuccessful cryptographic operations. Also in this case, if the reader device or the server is not available, the time-out cannot be counted.

SUMMARY OF THE INVENTION

The problem that serves the basis of the embodiments is to provide an IC Card for measuring time independently with respect to the reader device whereto the IC Card is connected. This allows the IC Card to be aware of time, not only when the reader device suspends the clock signal for avoiding power consumption, but also to be able to measure time independently with respect to potentially not trusted host devices, not always available and not precise in providing a timer service. Such an IC Card also avoids a maximum power consumption for an internal clock during the clock stop status, thus overcoming the limitations of the current IC Card in measuring time over multiple APDUs, during security operations, as well as overcoming other limitations that currently affect the known IC Cards.

The approach includes providing an IC Card including a low precision clock to be used when the reader device reduces the power supply and suspends the clock signal, in order to allow the IC Card to measure a period of time also in absence of the clock signal provided by the reader device.

Moreover, the approach includes providing a method to activate such a low precision clock only when it is strictly necessary to measure time, for example, when security operations may be executed also in absence of the clock signal provided by the reader device.

Such approach addresses prior art shortcomings by an IC Card comprising electronic components structured to receive a power supply and a clock signal by a reader device. The power supply is provided to a subset of the electronic components during a clock stop status wherein the clock signal is suspended for avoiding a maximum power consumption threshold. The IC Card comprises a low precision clock included in the subset of electronic components for measuring time in the clock stop status.

The low precision clock is activated by a method for activating a low precision clock inside an IC Card of the type receiving a power supply and a clock signal by a reader device. The power supply is provided to a subset of the electronic components during a clock stop status, wherein the clock signal is suspended. A low precision clock signal is provided in the subset of electronic components, and the low precision clock is activated, before the clock signal is suspended, in order to allow time measurement in the clock stop status.

DETAILED DESCRIPTION OF THE PREFERRED EMBODIMENTS

Figure 1:
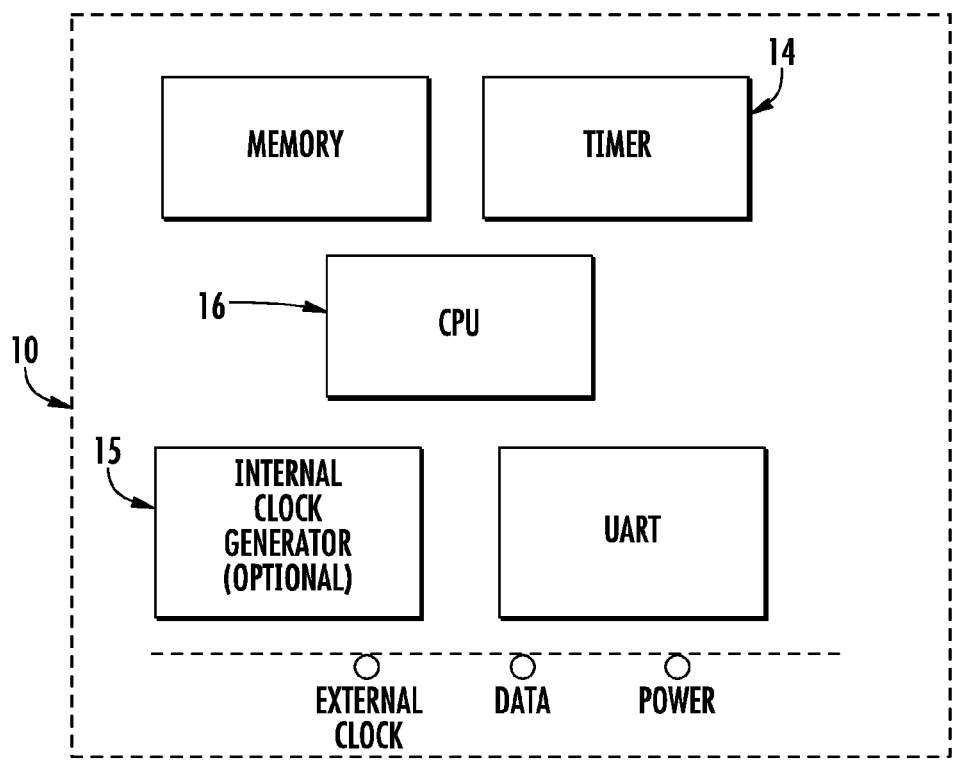
FIG. 1 schematically represents an IC Card according to the prior art.
Figure 2:
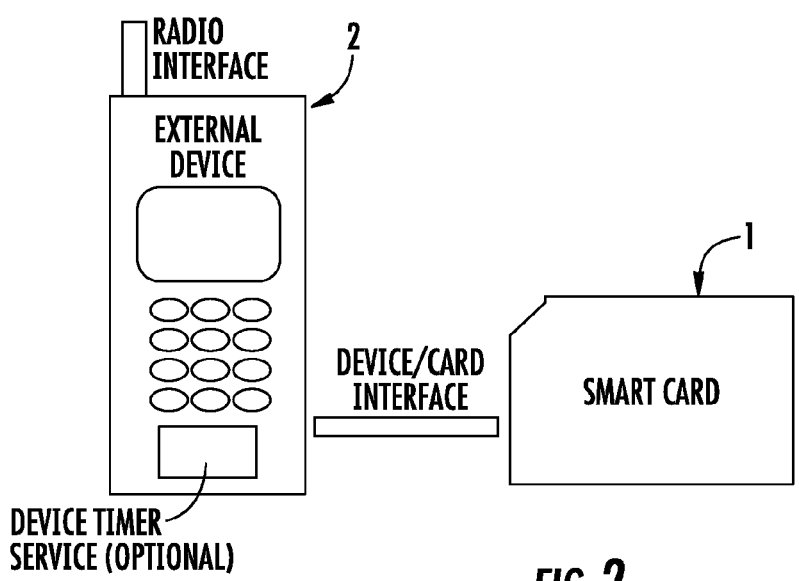
FIG. 2 schematically represents a reader device intended to be connected to the IC Card of FIG. 1 and providing it a clock signal, according to the prior art.
Figure 3:
FIG. 3 schematically represents an execution of a couple of consecutive APDUs by the IC Card of FIG. 1.
Figure 4:
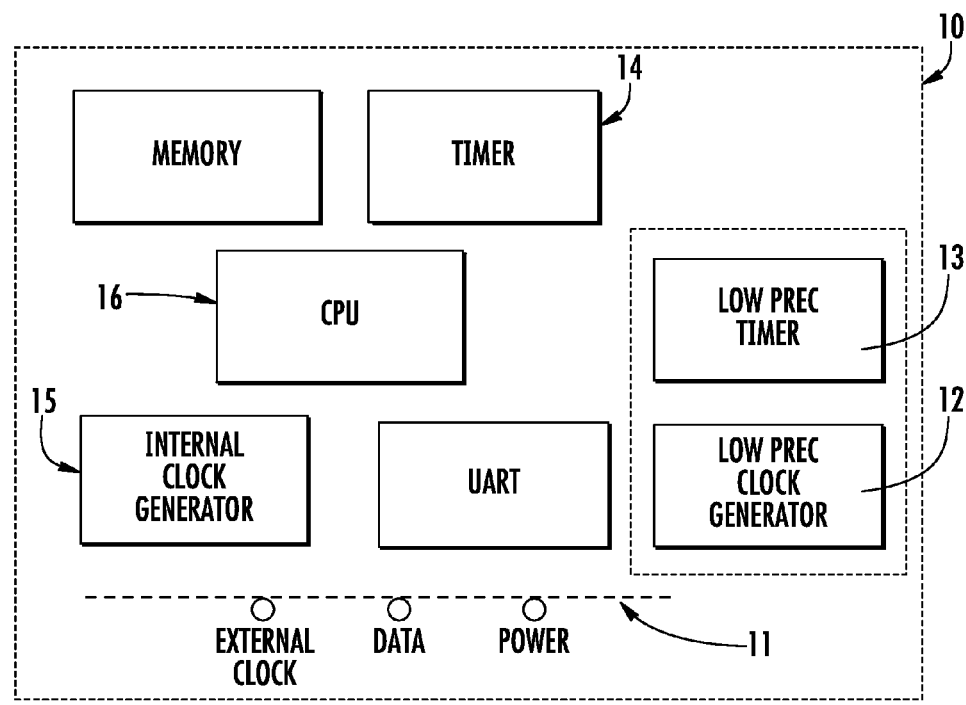
FIG. 4 schematically represents an IC Card according to the present invention.
Figure 5:
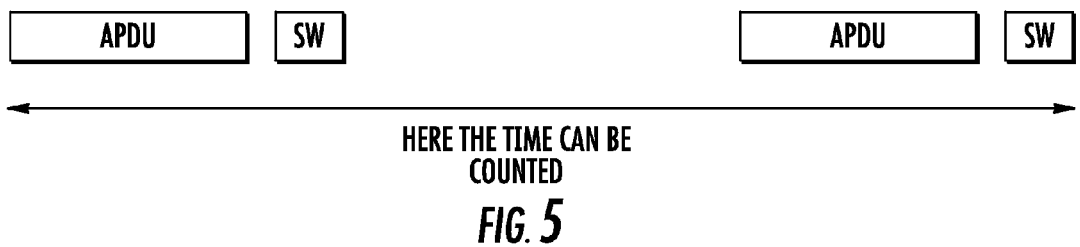
FIG. 5 schematically represents an execution of a couple of consecutive APDUs by the IC Card of FIG. 4.

With reference to the annexed drawings and in particular with reference to FIG. 4, it is schematically represented and globally referenced with 10 an IC Card comprising electronic components, such as a memory portion, a timer, a CPU and a UART.

The IC Card 10 may be connected via a bus 11 to a reader device, not represented because it is conventional. When connected, the reader device provides a power supply to the IC Card 10, and a clock signal for synchronizing electronic components inside the IC Card 10, for example, for synchronizing the instruction decoder, the ALU, and the memory bus. The above clock signal will be referred hereinafter as the main clock signal.

To save energy, the reader device may enter in a main clock stop status wherein it suspends the main clock signal. The IC Card 10 reacts by suspending the power supply to one or more electronic components used for counting time, like the timer, and the CPU, for example.

The IC Card 10 may also comprise an internal clock for generating an internal clock signal during a main clock stop status. Such internal clock cannot produce the internal signal because a maximum threshold of power consumption shall be avoided during main clock stop status.

According to the embodiments, the IC Card 10 comprises a low precision clock 12 having a low power consumption. The low precision clock 12 is an additional electronic component included inside the hardware of the IC Card 10, and it is used for generating a low clock signal with a low power consumption. More particularly, the low clock signal is less precise and less power consuming with respect to both an internal clock signal generated by the internal clock or a main clock signal generated by the reader device, and it satisfies the power consumption requirements during a main clock stop status.

To measure time, the IC Card 10 comprises a low precision timer 13, including a counter incremented at each low clock signal generated by the low precision clock 12. For example, the IC Card 10 may use the low precision timer 13 for storing a low threshold value and to compare the low threshold value with a counter. The counter is incremented by the low precision clock 12 at each low signal clock. When the counter reaches the low threshold value, the low precision timer 13 is aware that a specific time has elapsed.

According to an embodiment, the IC Card 10 may measure time also in the main clock stop status and, for example, it may send interrupts to the electronic components of the IC Card 10. Advantageously, the low precision clock 12 is not designed to be precise in time measurements since its aim is to control a frequency of executions of specific security related operations and not to reach high performance or to be considered a real time reference. For example, in case of security attacks, the low precision clock 12 may slow down the executions of security enforcing operations, for example, repetitions of authentication attempts. The low precision clock 12 may also be used to implement a time-out for specific activities, for example, for network communications in which the time cannot be measured through a signal clock provided by the reader device, nor through an internal clock signal provided by an internal clock, due to power consumption constraints.

According to an embodiment, a method to activate the low precision clock 12 is provided to optimize the power consumption, not only through the hardware specification of the low precision timer 13, but also through an activation of the low precision timer 13 only when specific events occur.

Figure 6:
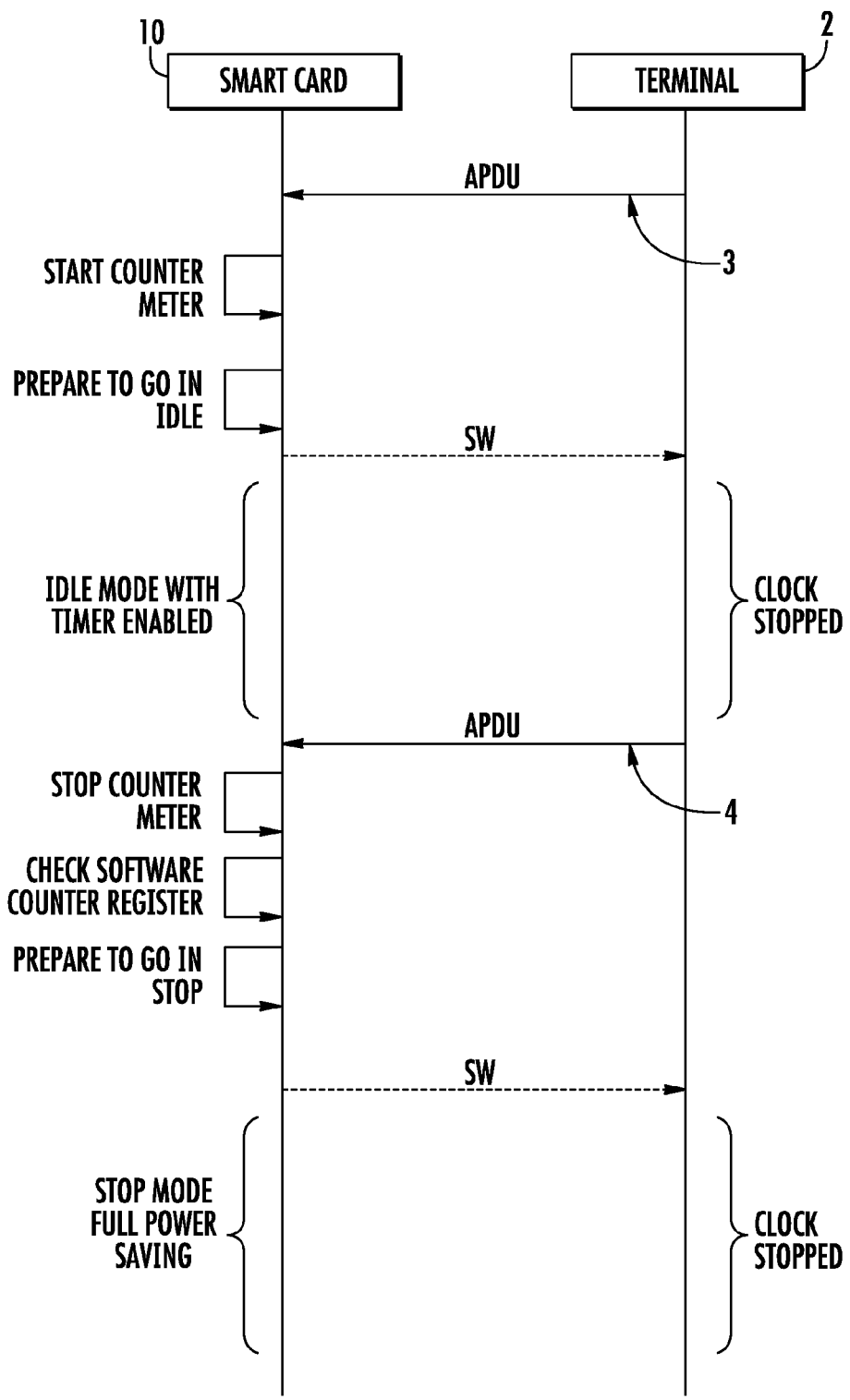
FIG. 6 schematically represents a communication between the IC Card of FIG. 4 and a read-write device, according to the present invention.

With reference to FIG. 6, a sequence of communications between an IC Card 10 and a reader device 2 are schematically represented. Such communications including a couple of APDUs 3, 4 in which the reader device 2 sends a command to the IC Card 10, and the IC Card 10 returns to the reader device 2 results based on software computations SW. More particularly, between a first 3 and a second 4 APDU of such couple of APDUs 3, 4, the IC Card 10 could enter into a main clock stop status, due to the power supply suspension from the reader device 2.

According to an embodiment, to allow time measurements during the main clock stop status, the low precision clock 12 is activated based on the following steps. More particularly, during the normal operation of the IC Card 10, for example, during the first APDU 3 execution, the operating system of the IC Card triggers a time measurement. The time measurement is generally required during normal operation because the IC Card 10 is in a status in which an activation of the low precision clock 12 may be executed before the main clock stop status.

As illustrated in FIG. 6, the APDU 3 is processed by the IC Card 10 and it is terminated. After the processing of the APDU 3, the IC Card 10 operating system executes a counter phase, including an initialization of hardware timer register and a chronometer routine. The IC Card 10 then returns a response SW to the reader device 2, processed based on the APDU 3 request. After the execution of the APDU 3, the IC Card 10 prevents a potential main clock stop status from entering an idle status, in which the low precision clock 12 is active while other electronic components are switched off.

As stated above, not all the other electronic components must be switched off, for example, the memory portion, registers and few other components. More particularly, the idle status is entered by the IC Card 10 because a time measurement after the APDU 3 could be required, for example, to execute countermeasures against security attacks.

Advantageously, according to the method of activating a low precision clock, a time measurement is generally required to the low precision timer 13 only when the IC Card 10 risks entering a main clock stop status in a specific moment in which time measures may be required. After having received the response SW following the APDU 3, the reader device 2 may suspend the main clock signal to IC Card 10. Advantageously, the IC Card 10 enters the main clock stop status but, at the same time, may measure time due to the activation of the low precision clock 12.

In fact, during the main clock stop status, the low precision timer 13 may expire one or more times. The low precision timer 13 (and hardware timers in general) usually may not be designed to run for long time, while a main clock stop status may last dozens of seconds (a long time for typical microprocessor activities).

Each time the low precision timer 13 expires, the CPU is awakened, a chronometer routine is updated to keep track of how many times the low precision timer 13 is expired, and the low precision timer 13 is reset. The IC Card 10 may enter the idle status again with only low precision timer 13 active.

Before the execution of the second APDU 4, the reader device 2 may enable the main clock signal so that the IC Card 10 exits the main clock stop status. At this point, the time passed can be measured considering the result of the chronometer routine and the remaining value in the low precision timer 13.

When the second APDU 4 is executed, the IC Card 10 operating system may decide if it is desirable to measure time again, avoiding a potential main clock stop, or if it is not required to be aware of time, for example, since the following operations do not involve security operations. In other words, the method provides that the IC Card 10 may enter a special status, the idle status, only as long as it is strictly needed to measure time, thus avoiding unnecessary power consumption.

According to an embodiment, the low precision timer 13 may be adjusted without introducing additional power consumption. More particularly, when a network connection to a host device providing timer service is available, the low precision timer 13 may be compared and adjusted with respect to a value returned by the timer service. To avoid security attacks due to a potential untrusted host device, a tolerance may be set for the low precision timer 13. If the comparison between the low precision timer 13 and the value returned by the timer service respects the tolerance, the low precision timer 13 is adjusted in order to gain precision without additional power consumption. Otherwise, if the comparison between the low precision timer 13 and the value returned by the timer service is out of tolerance, the adjustment of the low precision timer 13 is rejected because of a potential untrusted host device.

For example, supposing a tolerance equal to 10% in an initial state, both the low precision timer 13 and host device timer are set to 0, a time-out for the low precision timer 13 may occur, for example, at 90, and after the time out has occurred, an adjustment of the low precision timer 13 may be requested, for example, when the low precision timer 13 is at 100 and the host device timer is at 110. Since the tolerance of 10% is respected, the low precision timer 13 is corrected with the current value of the host device timer.

According to an embodiment, the adjustment of the low precision timer cannot be executed without respecting the tolerance. Moreover, even if the tolerance is respected, the low precision timer 13 may not be adjusted more than a value in a specific prefixed range. In fact, a host device may answer when an adjustment is needed with a forged value even if admitted by the tolerance.

In the example given above, the host device may return a value less than the low precision timer 13, but respecting the 10% tolerance. Accordingly, the IC Card 10 reacts, accelerating the low precision timer 13.

At the next adjustment request, the host device may again return a lower value with respect to the low precision timer 13 so that the low precision timer 13 is accelerated again. For example, in an initial state, the low precision timer 13 and the host device timer time are both set to 0. When the low precision timer 13 is at 100, the host device timer is at 90, 90 being a forged value. An adjustment factor between the low precision timer 13 and the host device timer is equal to 1.1, respecting the tolerance. When the low precision timer 13 is at 200, due to the adjustment factor 1.1, a real value of the low precision timer 13 should be 182. In this case, if the host device timer is set to a forged value of 180, the adjustment factor between the real value (182) of the low precision timer 13 and the host device timer is equal to 1.1*1.1, due to a previous adjustment. In this case the factor increases and becomes 1, 21. The low precision timer is adjusted until the factor respects the prefixed range, otherwise the adjustment is aborted.

The method to activate the low precision clock 12 may be executed on an internal clock inside of the IC Card 10 in order to activate an internal clock signal only when strictly required. This method, hereinafter also indicated as a method to activate an internal clock, includes the same phases of execution of the method to activate the low precision clock 12 described above.

Again, with reference to FIG. 6, the IC Card 10, according to the method to activate an internal clock, may comprise an internal clock with high precision and conventional power consumption. An APDU 3 is processed by the IC Card 10 and it is terminated. After the processing of the APDU 3, the IC Card 10 operating system executes a counter phase, comprising an initialization of a hardware timer register and a chronometer routine. Then the IC Card 10 returns a response SW to the reader device 2, processed based on the APDU 3 request. After the execution of the APDU 3, the IC Card 10 avoids a main clock stop status from entering an idle status, in which the internal clock is active, while other electronic components are switched off.

As stated above not all the other electronic components must be switched off, for example, the memory portion, registers and few other components. Also in this case, the idle status is entered by the IC Card 10 because a time measurement after the APDU 3 could be useful, for example, to execute countermeasures against security attack. In other words, a time measurement is generally required to the internal clock only when the IC Card 10 risks being set in a main clock stop status in a specific moment in which such main clock stop status should be avoided.

After having received the response SW following the APDU 3, the reader device 2 may suspend the main clock signal to IC Card 10. Advantageously, the IC Card 10 is in a main clock stop status, but allowed to measure time. In fact, during the main clock stop status, an internal timer, associated to the internal clock of the IC Card 10 may expire one or more times. Every time the internal timer expires, the CPU is awakened, the chronometer routine updated, and the internal timer reset so that the IC Card 10 may enter the idle status again with only the internal timer active. Before the second APDU 4, the reader device 2 may enable the main clock signal so that the IC Card 10 exits the main clock stop status. When the second APDU 4 is executed, the IC Card 10 operating system may trigger a new time measurement, replacing a potential main clock stop with an internal clock, or avoiding the triggering of a new time measurement in order to limit power consumption.

According to the method for activating the internal clock, the IC Card 10 may enter the idle status only as long as it is strictly needed to measure time, thus avoiding higher power consumption due to the internal clock.

The method to measure time while the IC Card 10 is in clock stop described above is still valid when the IC Card is still provided with an internal clock and internal timer configurable to run even in main clock stop status, even if no low precision clock and timer are present. In this case, the constraint in maximum power consumption stated by most standard technical specifications could not be satisfied and is disregarded. Hereafter, a brief description of the main characteristics and phases of the IC Card 10 and method are described.

The IC Card 10 comprises electronic components of the type intended to receive a power supply and a main clock signal by a reader device. The power supply is provided to a subset of the electronic components during a main clock stop status, wherein the main clock signal is suspended.

The IC Card 10 comprises a low precision clock 12, included in the subset of electronic components that remain active during a main clock stop status for generating a low clock signal in the main clock stop status. A clock frequency of the low precision clock 12 is lower than a clock frequency of the clock signal, and then the eventual conventional internal clock, in order to be less power consuming with respect to such clock signal. A low precision timer 13 for measuring time in the main clock stop status is incremented based on the low clock signal.

An embodiment includes a method for activating the low precision timer 12 inside the IC Card 10 structured to receive the power supply and the main clock signal by the reader device. The power supply is provided to the subset of the electronic components during a main clock stop status, wherein the main clock signal is suspended.

The method comprises a phase for activating an idle status for the IC Card 10, comprising an activation of a low precision clock 12. The phase is executed before the main clock signal is suspended to allow time measurement in the main clock stop status. The method also comprises a checking phase for triggering an execution of the phase for activating an idle status to execute the phase for activating in specific conditions. Such specific conditions comprise an occurrence of a couple of consecutive APDUs, or an execution of security operations.

The method for activating a low precision timer 13 also comprises a phase for initialising a low precision timer 13 and a phase for incrementing the low precision timer 13 based on the low precision clock 12. The method also includes a phase for comparing the low precision timer 13 with a predefined threshold, returning a time-out when the low precision timer 13 is greater than the threshold.

According to the method, hereafter described are advantageous embodiments for measuring time. In an IC Card 10 provided with electronic components including an internal clock 15 and hardware timer register 14, a power supply and a main clock signal are provided by the reader device. The power supply is provided to a subset of the electronic components during a main clock stop status wherein the main clock signal is suspended. More particularly, before entering the main clock stop status, the hardware timer register 14 and one or more counting time routines are initialized to measure and keep track of the time.

During a main clock stop status, the power supply is maintained for the internal clock 15, if it is yet activated. On the contrary, if the internal clock 15 is not active, it is activated before entering the main clock stop status. At the same time, the power supply is maintained for the hardware timer register 14, in addition to other devices that are usually powered during main clock stop (for example memory portions). During the main clock stop status, if the hardware timer register 14 expires, the power supply is provided to a CPU 16, included in the IC Card 10, so that one or more counting routines are executed to measure time.

When the routines are completed, the hardware timer register 14 is re-initialized and the power supply to the CPU 16 suspended. The value stored by the hardware timer register 14 and the time counted by the counting time routines are determined in order to measure time when the main clock stop status is finished.

The method may also be executed with a low precision clock of the type described above. In this case, before entering the main clock stop status, the hardware timer register 14 and one or more routines are initialized to measure and keep track of the time.

During a main clock stop status, the power supply is maintained to at least the low precision clock 12 and the hardware timer register 14, if yet active. Otherwise, at least the low precision clock 12 and the hardware timer register 14 may be activated and provided with the power supply. Of course, other devices usually powered during main clock stop may be maintained active.

During the main clock stop status, if the hardware timer 14 expires, power supply to the CPU 16 is furnished and the routines are executed to measure time. After the execution of routines, the hardware timer register 14 is re-initialized and the power supply to the CPU 10 suspended. When the main clock stop status is exited, the remaining value stored by the hardware timer register 14 is evaluated and the values processed by the routines evaluated to measure the time.

The method may also be executed with a low precision timer 13 of the type described above. Before entering the main clock stop status, the low precision timer 13 and routines are initialized.

During the main clock stop status, the power supply is maintained for, at least, the low precision clock 12 and the low precision timer 13, yet activated. On the contrary, the low precision clock 12 and the low precision timer 13 are activated and maintained powered.

During the main clock stop status, if the low precision timer 13 expires, the power supply is furnished to the CPU 16 and the routines executed to measure time. After routines completion, the low precision timer 13 is re-initialized and the power supply to the CPU 16 is suspended. When the main clock stop status is exited, the remaining value stored by the low precision timer 13 is evaluated and the result of the routines are processed to have a measure of time.

Advantageously, an IC Card 10 for measuring time independently with respect to the reader device whereto it is connected is provided. In fact, the IC Card 10 is allowed to measure time not only when the reader device 2 suspends the clock signal, in order to avoid power consumption, but also to measure time independent by host devices or non-trusted electronic unit. Moreover, the IC Card 10 generally does not require a network connection for measuring time, for example, a connection to external devices providing timer services, because the low precision timer is active inside the IC Card 10.

Moreover, the low precision timer avoids a maximum power consumption admitted for the IC Card 10 itself, during a main clock stop status determined by the reader device, not only through the low power consumption requirement of the low precision timer, but also through the method for activating the low precision timer. This provides such activation only when strictly needed. Furthermore, the IC Card 10 and the method for activating a low precision timer overcomes the limitations in measuring time over multiple APDUs, as well as the limitations related to security operations.

That which is claimed is:

1. An IC Card comprising:
   a plurality of electronic components comprising an internal clock, a hardware timer register, and a low precision clock, said plurality of electronic components configured to receive power and a main clock signal from a reader device, said internal clock, said hardware timer register, and said low precision timer being configured to receive the power during a suspension of the main clock signal, and said low precision clock being configured to generate a clock signal during the main clock signal suspension;
   a timer configured to
      measure a period of time during a main clock signal suspension,
      initialize before the suspension of the main clock signal, and
      increment based upon the clock signal; and
   a central processing unit (CPU) configured to execute at least one counting time routine upon expiration of said timer during the suspension of the main clock signal, and have power thereto suspended when the at least one counting time routine is completed;
   said hardware timer register also being configured to re-initialize when the at least one counting time routine is completed.

2. The IC Card according to claim 1, wherein said low precision clock is configured to generate the clock signal before the main clock signal suspension.

3. The IC Card according to claim 1, wherein said low precision clock has a clock frequency lower than a clock frequency of said main clock signal.

4. The IC Card according to claim 1, wherein said low precision clock signal is configured to cause less power consumption than said main clock signal.

5. A method for activating a low precision clock inside an IC Card, the IC Card receiving power and a main clock signal from a reader device, the power being provided to a subset of electronic components of the IC Card during a main clock stop status wherein the main clock signal is suspended, the method comprising:
   activating the low precision clock;
   providing a low precision clock signal to the subset of electronic components before the suspension of the main clock signal to allow a time measurement in the main clock stop status;
   measuring a period of time during a main clock signal suspension with a hardware timer;
   incrementing the hardware timer based on the clock signal;
   initializing a hardware timer register and at least one counting time routine of the IC Card before entering the main clock stop status;
   providing the power to at least the low precision clock and the hardware timer register during the main clock stop status;
   providing the power to a CPU of the IC Card for executing the at least one counting time routine if the hardware timer expires during the main clock stop status; and
   re-initializing the hardware timer register and suspending the power to the CPU when the at least one counting time routine is completed.

6. The method for according to claim 5, further comprising providing a checking phase for triggering an execution of an activation of the low precision clock to activate the low precision clock when at least one specific condition occurs.

7. The method according to claim 6, wherein the at least one specific condition comprises an execution of a plurality of consecutive application programmable data units (APDUs).

8. The method according to claim 6, wherein the at least one specific condition comprises an execution of a security operation.

9. The method according to claim 5, wherein said hardware timer comprises a low precision timer.

10. A method for measuring time in a IC Card comprising electronic components including an internal clock and a hardware timer register, the IC Card receiving power and a main clock signal from a reader device, the power being provided to a subset of the electronic components during a main clock stop status wherein the main clock signal is suspended, the method comprising:
    initializing the hardware timer register and at least one counting time routine before entering the main clock stop status;

providing the power to at least the internal clock and the hardware timer register during the main clock stop status;

providing the power to a CPU of the IC Card for executing the at least one counting time routine when the hardware timer register expires during the main clock stop status;

suspending the power to the CPU and re-initializing the hardware timer register when the at least one counting time routine is completed; and evaluating a value stored in the hardware timer register and a time counted by the at least one counting time routine when the main clock stop status is exited.

11. The method according to claim 10, wherein the internal clock has a clock frequency lower than a clock frequency of the main clock signal.

12. The method according to claim 10, wherein the internal clock generates an internal clock signal that consumes less power than the main clock signal.

13. An integrated circuit for an IC Card, the integrated circuit comprising:
a plurality of electronic components comprising an internal clock, a hardware timer resister, and a low precision clock, said plurality of electronic components configured to receive power and a main clock signal from a reader device, said internal clock, said hardware timer register, and said low precision timer being configured to receive the power during a suspension of the main clock signal, and said low precision clock being configured to generate a clock signal during the main clock signal suspension;

a timer configured to
measure a period of time during a main clock signal suspension,
initialize before the suspension of the main clock signal, and
increment based upon the clock signal; and a central processing unit (CPU) configured to execute at least one counting time routine upon expiration of said timer during the suspension of the main clock signal, and have power thereto suspended when the at least one counting time routine is completed;

said hardware timer resister also being configured to re-initialize when the at least one counting time routine is completed.

14. The integrated circuit according to claim 13, wherein said low precession clock is configured to generate the clock signal before the main clock signal suspension.

15. The integrated circuit according to claim 13, wherein said low precession clock has a clock frequency lower than a clock frequency of said main clock signal.

16. The integrated circuit according to claim 13, wherein said low precision clock signal is configured to cause less power consumption than said main clock signal.

* * * * *

UNITED STATES PATENT AND TRADEMARK OFFICE
CERTIFICATE OF CORRECTION

| | |
|---|---|
| PATENT NO. | : 8,499,180 B2 |
| APPLICATION NO. | : 12/122359 |
| DATED | : July 30, 2013 |
| INVENTOR(S) | : Varone et al. |

It is certified that error appears in the above-identified patent and that said Letters Patent is hereby corrected as shown below:

In the Claims

Column 12, Line 19, Claim 14  Delete: "said low precession"
Insert: --said low precision--

Column 12, Line 22, Claim 15  Delete: "said low precession"
Insert: --said low precision--

Signed and Sealed this
Fourth Day of March, 2014

Michelle K. Lee
*Deputy Director of the United States Patent and Trademark Office*